United States Patent [19]

Fotis

[11] 4,024,669
[45] May 24, 1977

[54] BUBBLE CHUM

[75] Inventor: James W. Fotis, Forest Hills, N.Y.

[73] Assignee: Lawrence Peska Associates, Inc., New York, N.Y. ; a part interest

[22] Filed: Mar. 18, 1976

[21] Appl. No.: 667,899

[52] U.S. Cl. .............................................. 43/44.99
[51] Int. Cl.² ...................................... A01K 97/02
[58] Field of Search ................................... 43/44.99

[56] References Cited
UNITED STATES PATENTS

| 758,434 | 4/1904 | Forster | 43/44.99 |
| 2,465,127 | 3/1949 | Stark | 43/44.99 |
| 2,729,912 | 1/1956 | Moffett | 43/44.99 |
| 3,163,959 | 1/1965 | Hollar | 43/44.99 |

Primary Examiner—Hugh R. Chamblee
Assistant Examiner—Daniel J. Leach
Attorney, Agent, or Firm—Eugene V. Mandel

[57] ABSTRACT

An apparatus for attracting fish by the dispensation of bait or the like that can be remotely controlled from a fishing boat or dock and may be used at different depths. The apparatus comprises an aerosol can containing bait or the like which is secured to an anchor rope by a pair of rings. An arm is pivotally mounted to the ring support and has a line attached thereto whereby movement of the line will pivot the arm to activate the can to dispense the bait.

4 Claims, 2 Drawing Figures

BUBBLE CHUM

BACKGROUND OF THE INVENTION

This invention relates to apparatuses for attracting fish, and more particularly to an apparatus for attracting fish by the dispensation of bait and the like.

Fishermen have found that "chum," a type of bait consisting of ground up oily fish, is very effective for attracting fish within a several mile radius. Only small amounts of chum are needed for the desired effect and may be dispensed from an aerosol container. Other flavored scented forms of bait as well as compressed air can also be used as a means for attracting fish. It is desirable that the depth at which the bait or chum is dispensed be variable to compensate for different types of fish and different natural conditions.

SUMMARY OF THE INVENTION

It is a primary object of the present invention to provide an apparatus for attracting fish in a wide area of the sea by the dispensation of bait or the like from an aerosol can causing the fish to congregate in a given area so they can be caught by fisherman.

It is a further object of the present invention to provide an apparatus for attracting fish that employs an aerosol can containing bait or the like.

A still further object of the present invention is to provide an apparatus for attracting fish that provides means for the activation of an aerosol can at a remote location.

Another object of the present invention is to provide an apparatus for attracting fish that can be used at different depths.

Another still further object of the present invention is to provide an apparatus for attracting fish that is simple to operate, easy to maintain, and inexpensive to manufacture.

These objects, as well as further objects and advantages, of the present invention will become readily apparent after reading the description of a non-limiting illustrative embodiment and the accompanying drawing.

An apparatus for attracting fish by the dispensation of bait or the like from an aerosol comprises a housing for an aerosol container, means for the activation of the aerosol container affixed thereon, and means for the submersion of the aerosol container affixed to said housing.

BRIEF DESCRIPTION OF THE DRAWINGS

In order that the present invention may be more fully understood it will now be described, by way of example, with reference to the accompanying drawings in which.

DESCRIPTION OF THE PREFERRED EMBODIMENT

Figure 1:
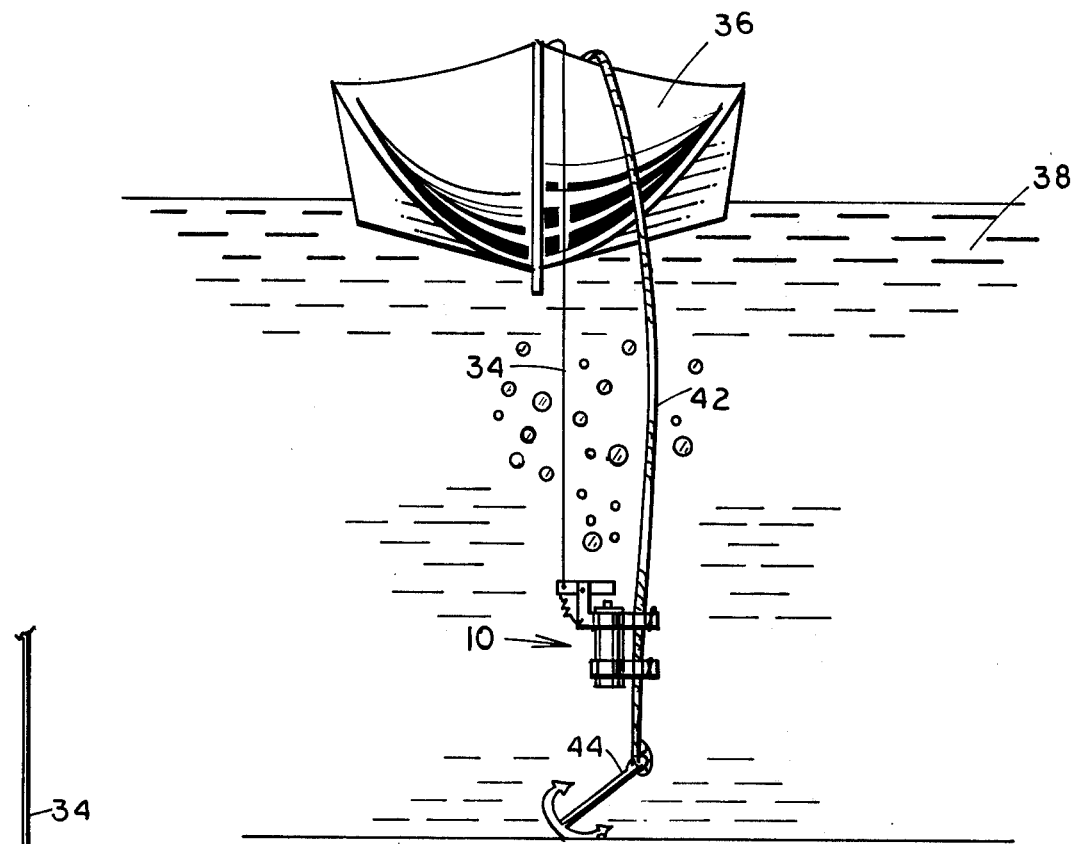
FIG. 1 is a pictorial representation of the preferred embodiment of the present invention in use with a boat anchor.
Figure 2:
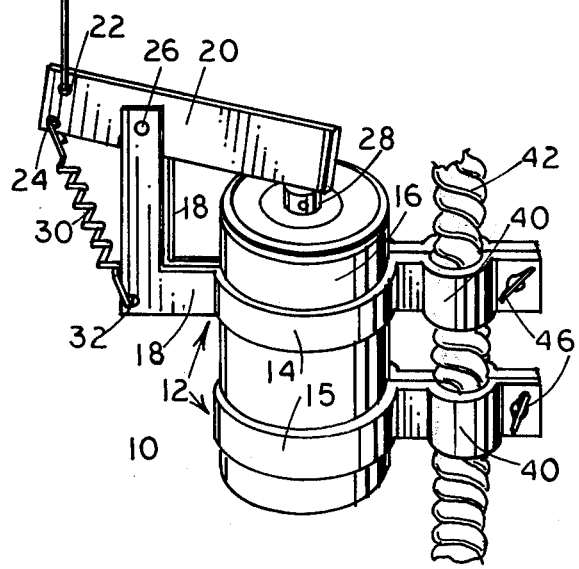
FIG. 2 is an enlarged pictorial representation of the preferred embodiment of the present invention.

Referring now to the Figures, and more particularly, to the embodiment illustrated in FIGS. 1 and 2 an apparatus 10 is shown for attracting fish. Apparatus 10 includes a housing 12 comprising an upper ring 14 and a lower ring 15 surrounding an aerosol can 16. A pair of L-shaped brackets 18 are affixed to upper ring 14. An arm 20 having holes 22, 24 is pivotally affixed in between the L-shaped brackets 18 by a pivot 26. Arm 20 is of sufficient length to be able to activate a valve spray top 28 of aerosol can 16. A coil spring 30 is affixed on one side in hole 24 of arm 20 and on the other side to the L-shaped brackets 18 in their holes 32. A line 34 is affixed to hole 22 of arm 20 and is placed in a boat 36 floating on water 38. A pair of clamps 40 are affixed to the rings 14, 15 and circumscribe an anchor rope 42 affixed on one end to the boat 36 and on the other end to an anchor 44. A pair of thumb screws 46 tighten the clamps 40 in position on the rope 42.

In operation, the apparatus 10 is secured on rope 42 in the desired position prior to the dropping of the anchor 44. Then the anchor 44 is dropped. When the line 34 is pulled it causes the arm 20 to pivot and depress the valve spray top 28 of the can 16 causing the dispensation of the contents therein. When tension is released on the line 34 the spring 30 pulls the arm 20 down on one end and it pivots away from the valve spring top 28. Aerosol can 16 may be fitted with different kinds of bait or the like including chum or compressed air. Only the amount needed for the desired effect need be dispensed and if additional bait is desired a pull on the line 34 dispenses an additional quantity. Apparatus 10 is preferably constructed of plastic which has a long life in salt water and fresh water. Spring 30 and thumbscrews 46 are preferably stainless steel.

It will be understood that various changes in the details, materials, arrangments of parts and operating conditions which have been herein described and illustrated in order to explain the nature of the invention may be made by those skilled in the art within the principles and scope of the invention.

Having thus set forth the nature of the invention, what is claimed is:

1. An apparatus for attracting fish by the dispensation of bait, or the like from an aerosol container comprising:
    a. a housing for an aerosol container;
    b. means for the activation of said aerosol container affixed therein; and
    c. means for the submersion of said aerosol container affixed to said housing.

2. An apparatus for attracting fish according to claim 1 wherein said aerosol container housing comprises a pair of rings.

3. An apparatus for attracting fish according to claim 1, wherein said activation means comprises a pair of L-shaped brackets affixed to said housing, an arm pivotally affixed to said bracket, a spring affixed to said arm and said bracket, and a line affixed to said arm.

4. An apparatus for attracting fish according to claim 1, wherein said submersion means comprises a pair of clamps adapted to cooperate with a typical anchor rope and affixed to said housing and a pair of thumb screws adapted to secure said clamps on said anchor rope.

* * * * *